US012379144B2

(12) United States Patent
Knatt (10) Patent No.: US 12,379,144 B2
(45) Date of Patent: Aug. 5, 2025

(54) ICE MAKER AND SYSTEM AND METHOD FOR MONITORING WATER FILTER OF THE ICE MAKER (71) Applicant: True Manufacturing Co., Inc., O'Fallon, MO (US)

(72) Inventor: Kevin Knatt, O'Fallon, MO (US)

(73) Assignee: True Manufacturing Co., Inc., O'Fallon, MO (US)

( * ) Notice: Subject to any disclaimer, the term of this patent is extended or adjusted under 35 U.S.C. 154(b) by 168 days.

(21) Appl. No.: 18/170,182

(22) Filed: Feb. 16, 2023

(65) Prior Publication Data
US 2023/0288117 A1     Sep. 14, 2023

Related U.S. Application Data (60) Provisional application No. 63/318,580, filed on Mar. 10, 2022.

(51) Int. Cl.
F25C 1/25      (2018.01)
B01D 35/143    (2006.01)
C02F 1/00      (2023.01)

(52) U.S. Cl.
CPC ............ F25C 1/25 (2018.01); B01D 35/1435 (2013.01); C02F 1/003 (2013.01); C02F 1/008 (2013.01);
(Continued)

(58) Field of Classification Search
CPC .. F25D 29/008; F25D 29/005; F25D 2400/36; F25D 2400/361; F25D 2323/121; B67D 1/0884
See application file for complete search history.

(56) References Cited

U.S. PATENT DOCUMENTS 5,211,024 A * 5/1993 Manz ................ F25B 45/00
                                         62/149
5,236,578 A * 8/1993 Oleskow ............ G01F 1/24
                                         210/138
(Continued)

FOREIGN PATENT DOCUMENTS

AU    773871 B2 *  6/2004  ......... B01D 35/1435
CA    2380543 A1    11/2002
(Continued)

OTHER PUBLICATIONS

Extended European Search Report from EP Application No. 23159694.1, dated Jul. 13, 2023, 18 pages.

Primary Examiner — Jianying C Atkisson
Assistant Examiner — Meraj A Shaikh
(74) Attorney, Agent, or Firm — Stinson LLP (57) ABSTRACT In an ice maker, a controller is operatively connected to the ice maker's water system to determine a parameter indicative of a total amount of water filtered by a replaceable filter cartridge. Based on the determined parameter, the controller can provide a numerical indication of the total amount of water filtered by the replaceable filter cartridge. Based on the determined parameter, the controller can determine that the replaceable filter cartridge requires replacement. The parameter can be determined based on the amount of time a water inlet valve is opened and/or a water pressure signal. The controller can take action when it determines that the water filter needs replacement, for example, by making a local alarm indication, pushing a remote notification, or making an automated purchase transaction for a new filter cartridge.

13 Claims, 5 Drawing Sheets (52) U.S. Cl.
CPC .... *B01D 2201/56* (2013.01); *C02F 2201/005* (2013.01); *C02F 2201/006* (2013.01); *C02F 2209/03* (2013.01); *C02F 2209/40* (2013.01); *C02F 2209/445* (2013.01); *F25C 2600/04* (2013.01); *F25C 2700/00* (2013.01)

(56) References Cited

U.S. PATENT DOCUMENTS

| | | | |
|---|---|---|---|
| 5,408,834 A | 4/1995 | Schlosser et al. | |
| 5,435,909 A * | 7/1995 | Burrows | G01N 27/06 210/257.2 |
| 5,801,632 A | 9/1998 | Opal | |
| 6,060,987 A | 5/2000 | Marlia | |
| 6,150,935 A | 11/2000 | Anderson | |
| 6,370,890 B2 | 4/2002 | Roh et al. | |
| 6,393,848 B2 | 5/2002 | Roh et al. | |
| 6,442,952 B2 | 9/2002 | Roh et al. | |
| 6,502,411 B2 | 1/2003 | Okamoto | |
| 6,722,146 B2 | 4/2004 | Roh et al. | |
| 6,842,721 B2 | 1/2005 | Kim et al. | |
| 6,889,510 B2 | 5/2005 | Song et al. | |
| 6,892,545 B2 | 5/2005 | Ishikawa et al. | |
| 7,090,141 B2 | 8/2006 | Roh et al. | |
| 7,110,832 B2 | 9/2006 | Ghent | |
| 7,296,459 B2 | 11/2007 | Son et al. | |
| 7,490,477 B2 | 2/2009 | Singh et al. | |
| 7,552,029 B2 | 6/2009 | Elwood et al. | |
| 8,539,783 B1 | 9/2013 | Bunch | |
| 8,653,949 B2 | 2/2014 | Lee et al. | |
| 8,725,455 B2 | 5/2014 | Kriss | |
| 9,024,716 B2 | 5/2015 | Yum et al. | |
| 9,057,554 B2 | 6/2015 | Quinlan et al. | |
| 9,091,475 B2 | 7/2015 | Kang et al. | |
| 9,279,611 B2 | 3/2016 | Tan et al. | |
| 9,441,991 B2 | 9/2016 | Haga et al. | |
| 9,451,031 B2 | 9/2016 | Graziano et al. | |
| 9,644,886 B2 | 5/2017 | Shim | |
| 9,863,694 B2 | 1/2018 | Broadbent | |
| 10,142,820 B2 | 11/2018 | Root | |
| 10,153,915 B2 | 12/2018 | Doberstein et al. | |
| 10,238,259 B2 | 3/2019 | Langhammer et al. | |
| 10,256,982 B2 | 4/2019 | Rahman et al. | |
| 10,300,161 B2 | 5/2019 | Erbs | |
| 10,321,182 B2 | 6/2019 | Herz | |
| 10,341,133 B2 | 7/2019 | Wouhaybi et al. | |
| 10,361,999 B2 | 7/2019 | Vazquez et al. | |
| 10,380,863 B2 | 8/2019 | Wedig et al. | |
| 10,420,151 B2 | 9/2019 | Zakaria | |
| 10,444,868 B2 | 10/2019 | Lee | |
| 10,465,960 B2 | 11/2019 | Prabhakaran et al. | |
| 10,492,072 B1 | 11/2019 | Sokolov et al. | |
| 10,506,019 B2 | 12/2019 | Brian | |
| 10,510,110 B2 | 12/2019 | Takahashi et al. | |
| 10,511,950 B2 | 12/2019 | Maier et al. | |
| 10,531,247 B2 | 1/2020 | Kashef | |
| 10,536,527 B2 | 1/2020 | Ocejo et al. | |
| 10,540,871 B2 | 1/2020 | Wedig et al. | |
| 10,547,498 B1 | 1/2020 | Garner et al. | |
| 10,563,899 B2 | 2/2020 | Wilson | |
| 10,567,567 B2 | 2/2020 | Seo et al. | |
| 10,578,353 B2 | 3/2020 | Seidl et al. | |
| 10,673,707 B2 | 6/2020 | Dhanabalan et al. | |
| 10,722,096 B2 | 7/2020 | Gary, Jr. et al. | |
| 10,764,374 B1 | 9/2020 | Marquardt et al. | |
| 10,769,916 B2 | 9/2020 | Kim et al. | |
| 10,769,929 B2 | 9/2020 | Qiu et al. | |
| 2001/0023843 A1* | 9/2001 | Senner | C02F 9/20 210/232 |
| 2003/0000233 A1 | 1/2003 | Mazereeuw | |
| 2003/0024860 A1* | 2/2003 | Fritze | F25D 23/126 210/97 |
| 2003/0033165 A1 | 2/2003 | Inoue et al. | |
| 2003/0074912 A1 | 4/2003 | Maeda et al. | |
| 2004/0016242 A1 | 1/2004 | Song et al. | |
| 2005/0008539 A1 | 1/2005 | Matsuura et al. | |
| 2005/0120727 A1 | 6/2005 | Flinner et al. | |
| 2005/0132725 A1 | 6/2005 | Menten et al. | |
| 2006/0123806 A1 | 6/2006 | Vassilev et al. | |
| 2006/0143520 A1 | 6/2006 | Matsushima et al. | |
| 2006/0146773 A1 | 7/2006 | An et al. | |
| 2006/0150662 A1 | 7/2006 | Lee et al. | |
| 2006/0272341 A1 | 12/2006 | Shin et al. | |
| 2008/0250324 A1 | 10/2008 | Ito | |
| 2009/0024726 A1 | 1/2009 | Jeon et al. | |
| 2009/0072962 A1 | 3/2009 | Hitchin | |
| 2009/0273470 A1 | 11/2009 | Sinkevicius et al. | |
| 2009/0277199 A1 | 11/2009 | Manas et al. | |
| 2010/0152904 A1 | 6/2010 | Kawaguchi et al. | |
| 2011/0132009 A1 | 6/2011 | Lee | |
| 2012/0192575 A1* | 8/2012 | Tirumala | F25C 1/00 62/157 |
| 2012/0262294 A1 | 10/2012 | Nikolovski | |
| 2014/0244825 A1 | 9/2014 | Cao et al. | |
| 2015/0096352 A1 | 4/2015 | Peterson et al. | |
| 2015/0170503 A1 | 6/2015 | Wedig et al. | |
| 2015/0285552 A1 | 10/2015 | Swaidan et al. | |
| 2016/0018158 A1 | 1/2016 | Yokoo et al. | |
| 2016/0054043 A1 | 2/2016 | Broadbent | |
| 2016/0134432 A1 | 5/2016 | Hund et al. | |
| 2016/0139067 A1 | 5/2016 | Grace | |
| 2016/0204953 A1 | 7/2016 | Kim et al. | |
| 2017/0076584 A1 | 3/2017 | Eskildsen et al. | |
| 2017/0152132 A1* | 6/2017 | Laible | B67D 1/0888 |
| 2017/0169189 A1 | 6/2017 | Belz et al. | |
| 2017/0186079 A1* | 6/2017 | Kim | G06Q 30/0633 |
| 2017/0250834 A1 | 8/2017 | Hsiao | |
| 2017/0292780 A1 | 10/2017 | Li | |
| 2017/0310498 A1 | 10/2017 | Brandman et al. | |
| 2018/0005307 A1 | 1/2018 | Abedin et al. | |
| 2018/0102572 A1 | 4/2018 | Wedig et al. | |
| 2018/0102918 A1 | 4/2018 | Amini et al. | |
| 2018/0137457 A1 | 5/2018 | Sachs et al. | |
| 2018/0176774 A1 | 6/2018 | Miller | |
| 2018/0187969 A1 | 7/2018 | Kim et al. | |
| 2018/0197175 A1 | 7/2018 | Groarke | |
| 2018/0207305 A1 | 7/2018 | Almblad | |
| 2018/0211208 A1 | 7/2018 | Winkle et al. | |
| 2018/0306476 A1 | 10/2018 | Brady et al. | |
| 2018/0315200 A1 | 11/2018 | Davydov et al. | |
| 2018/0338280 A1 | 11/2018 | Zakaria et al. | |
| 2019/0003757 A1 | 1/2019 | Miros et al. | |
| 2019/0073800 A1 | 3/2019 | Lochny | |
| 2019/0133165 A1 | 5/2019 | Schmitz | |
| 2019/0174207 A1 | 6/2019 | Cella et al. | |
| 2019/0182259 A1 | 6/2019 | Qian et al. | |
| 2019/0182345 A1 | 6/2019 | Ji et al. | |
| 2019/0191284 A1 | 6/2019 | Tran et al. | |
| 2019/0245713 A1 | 8/2019 | Lo et al. | |
| 2019/0323767 A1 | 10/2019 | Meyers | |
| 2019/0333027 A1 | 10/2019 | Jones et al. | |
| 2019/0368805 A1 | 12/2019 | Lim et al. | |
| 2019/0390897 A1 | 12/2019 | Lee et al. | |
| 2020/0003471 A1 | 1/2020 | Broadbent | |
| 2020/0076640 A1 | 3/2020 | Han et al. | |
| 2020/0080769 A1 | 3/2020 | Han et al. | |
| 2020/0090192 A1 | 3/2020 | Sim et al. | |
| 2020/0096253 A1 | 3/2020 | Han et al. | |
| 2020/0097776 A1 | 3/2020 | Kim et al. | |
| 2020/0119946 A1 | 4/2020 | Ramirez et al. | |
| 2020/0124329 A1 | 4/2020 | Han et al. | |
| 2020/0132364 A1 | 4/2020 | Tran et al. | |
| 2020/0143294 A1 | 5/2020 | Brady et al. | |
| 2020/0182534 A1* | 6/2020 | Scalf | G01F 23/00 |
| 2020/0219377 A1 | 7/2020 | Shoari et al. | |
| 2020/0220932 A1 | 7/2020 | Gardner et al. | |
| 2020/0225626 A1 | 7/2020 | Huo et al. | |
| 2020/0248953 A1 | 8/2020 | Fujii | |
| 2020/0252231 A1 | 8/2020 | Nakashima | |
| 2020/0257321 A1 | 8/2020 | Ranjan et al. | |
| 2020/0260653 A1 | 8/2020 | Douglas et al. | |
| 2020/0278915 A1 | 9/2020 | Degaonkar et al. | |
| 2020/0285258 A1 | 9/2020 | Kates | |

(56) References Cited

U.S. PATENT DOCUMENTS

| | | |
|---|---|---|
| 2020/0295963 A2 | 9/2020 | Dulski et al. |
| 2020/0322177 A1 | 10/2020 | Kim et al. |
| 2022/0221211 A1 | 7/2022 | Knatt |

FOREIGN PATENT DOCUMENTS

| | | |
|---|---|---|
| CN | 112354250 A | 2/2021 |
| WO | 2002001920 A1 | 1/2002 |
| WO | 2005057093 A1 | 3/2006 |
| WO | 2010089193 A1 | 6/2010 |
| WO | 2011030288 A1 | 3/2011 |
| WO | 2012004747 A1 | 1/2012 |
| WO | 2013040854 A1 | 3/2013 |
| WO | 2013118142 A2 | 8/2013 |
| WO | 2013139189 A1 | 9/2013 |
| WO | 2014141538 A1 | 9/2014 |
| WO | 2016131609 A1 | 8/2016 |
| WO | 2017033240 A1 | 2/2017 |
| WO | 2017100897 A1 | 6/2017 |
| WO | 2017107398 A1 | 6/2017 |
| WO | 2017141265 A1 | 8/2017 |
| WO | 2017179188 A1 | 10/2017 |
| WO | 2017193234 A1 | 11/2017 |
| WO | 2017193235 A1 | 11/2017 |
| WO | 2017193236 A1 | 11/2017 |
| WO | 2017193237 A1 | 11/2017 |
| WO | 2017193238 A1 | 11/2017 |
| WO | 2018000986 A1 | 1/2018 |
| WO | 2018023434 A1 | 2/2018 |
| WO | 2018023435 A1 | 2/2018 |
| WO | 2018023436 A1 | 2/2018 |
| WO | 2018044091 A1 | 3/2018 |
| WO | 2018227714 A1 | 12/2018 |
| WO | 2019035109 A1 | 2/2019 |
| WO | 2019041962 A1 | 3/2019 |
| WO | 2019042408 A1 | 3/2019 |
| WO | 2019158754 A1 | 12/2019 |
| WO | 2020031433 A1 | 2/2020 |
| WO | 2020111961 A1 | 6/2020 |
| WO | 2020205820 A1 | 10/2020 |

\* cited by examiner

ICE MAKER AND SYSTEM AND METHOD FOR MONITORING WATER FILTER OF THE ICE MAKER

CROSS-REFERENCE TO RELATED APPLICATION

This Application claims priority to U.S. Provisional Patent Application No. 63/318,580, filed Mar. 10, 2022, which is hereby incorporated by reference in its entirety.

FIELD

This disclosure generally pertains to an ice maker and system and method for monitoring a water filter of the ice maker.

BACKGROUND

Dedicated ice makers are in wide commercial and residential use. Such ice makers comprise an ice formation device, a refrigeration system for cooling the ice formation device, and a water system for supplying water to the ice formation device. The ice formation device is chilled by the refrigeration system for cooling the water provided by the water system to form pieces of ice that are then collected in an ice storage device such as a bin. Dedicated ice makers of this type require recurring maintenance for optimal operation.

SUMMARY

In one aspect, an ice maker comprises an ice formation device. A refrigeration system cools the ice formation device. A water system supplies water to the ice formation device. The water system includes a water inlet valve and a water filter. The water inlet valve is configured to be selectively opened to supply water to the ice maker. The water filter is configured to filter the water supplied to the ice maker. The water filter includes a replaceable filter cartridge. The refrigeration system is configured to cool the ice formation device such that at least some of the filtered water from the water system forms into ice on the ice formation device. A controller is operatively connected to the water system. The controller is configured to determine a parameter indicative of a total amount of water filtered by the replaceable filter cartridge, and based on the determined parameter, at least one of (i) provide a numerical indication of the total amount of water filtered by the replaceable filter cartridge and (ii) determine that the replaceable filter cartridge requires replacement and output an alarm indication in response.

Other aspects and features will be apparent hereinafter.

BRIEF DESCRIPTION OF THE DRAWINGS

Corresponding parts are given corresponding reference characters throughout the drawings.

DETAILED DESCRIPTION

The inventors have recognized that ice maker operators can sometimes fail to comply with recurrent maintenance recommendations for their ice makers. Of particular relevance to this disclosure, ice maker operators may not comply with the schedule for replacing the replaceable filter cartridge of the water filter 147. Furthermore, the inventors have recognized that there are flaws with existing filter cartridge replacement scheduling. Conventionally, ice maker operators are instructed to replace ice maker filters on a time-based schedule, e.g., every six months. However, such scheduling is not based on a reliable estimate of filter cartridge usage. For instance, certain ice makers have adjustable purge settings, and with changes in the purge settings, the amount of water filtered by the water filter 147 over time will also change. Still other ice makers simply have more or less demand for ice. The inventors believe that it is the amount of water filtered by a filter cartridge that should dictate replacement scheduling, not the gross amount of time that a filter cartridge is in service. As explained more fully below, the inventors have conceived of new ways to both (1) promote replacement of the replaceable filter cartridge of the ice maker 103 when it is spent and (2) to schedule replacement of the filter cartridge based on a reasonably accurate estimate of the filter cartridge usage.

Figure 1:
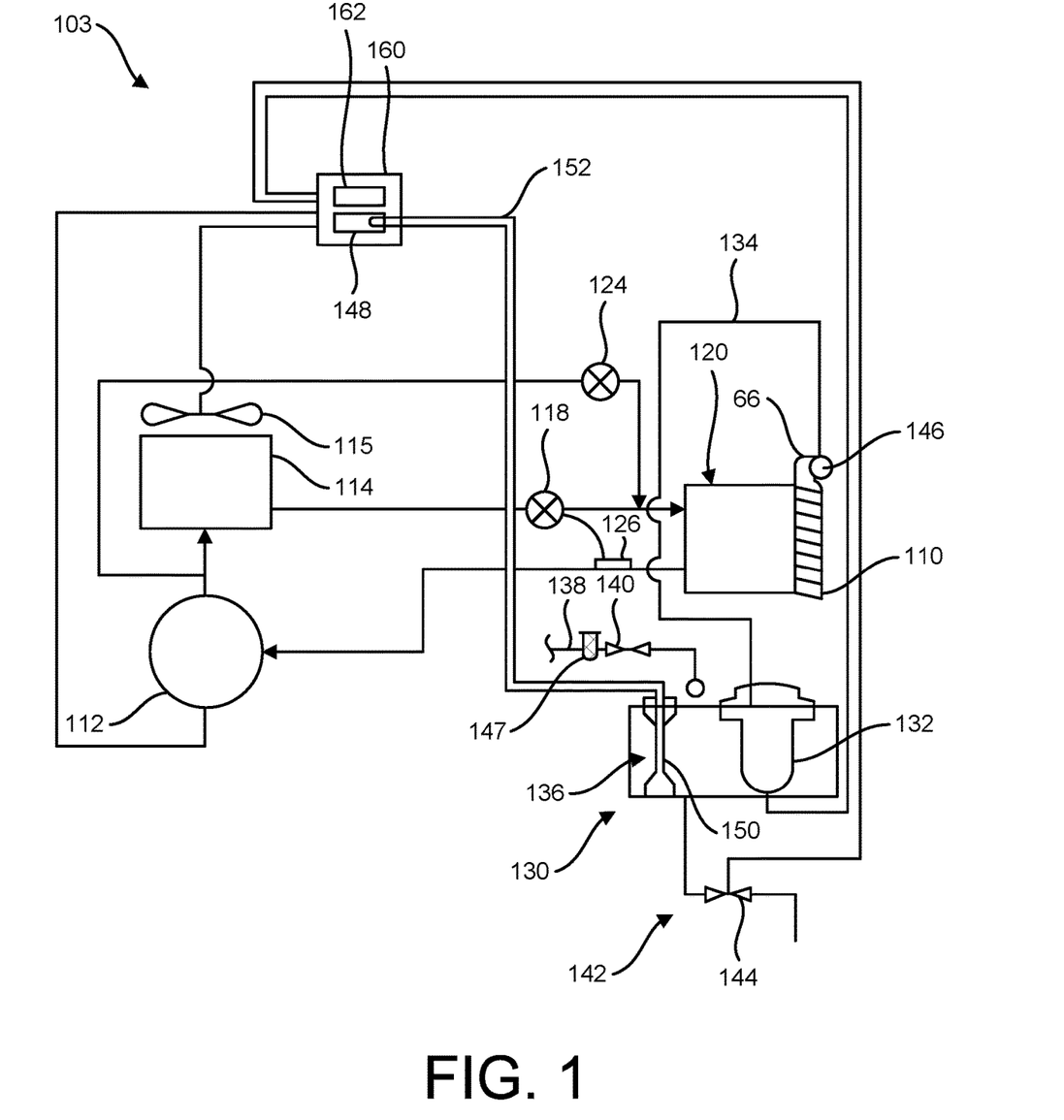
FIG. 1 is a schematic illustration of an ice maker.

Referring to FIG. 1, an exemplary embodiment of an ice maker is generally indicated at reference number 103. Ice makers in the scope of this disclosure may broadly comprise an ice formation device on which water can form into pieces of ice, a water system for directing water onto the ice formation device, and a refrigeration system configured to directly cool the ice formation device to a temperature at which at least some of the liquid water present on the ice formation device will freeze into ice. In the illustrated embodiment, the ice maker is a batch ice maker of the type which has a generally vertically oriented freeze plate 110 that constitutes the ice formation device. Other types of ice makers such as nugget ice makers and vertical spray ice makers are also contemplated to be in the scope of this disclosure. In a nugget ice maker, the ice formation device is typically a chilled cylinder disposed inside an auger; and in a vertical spray ice maker, the ice formation device is typically a horizontally oriented freeze plate including ice piece molds open downward for receiving vertically sprayed water that forms into ice in the molds.

The refrigeration system of the ice maker 103 includes a compressor 112, a heat rejecting heat exchanger 114, a refrigerant expansion device 118 for lowering the temperature and pressure of the refrigerant, an evaporator 120 along the back side of the freeze plate 110, and a hot gas valve 124. The compressor 112 can be a fixed speed compressor or a variable speed compressor to provide a broader range of operational control possibilities. As shown, the heat rejecting heat exchanger 114 may comprise a condenser for condensing compressed refrigerant vapor discharged from the compressor 112. In other embodiments, e.g., in refrigeration systems that utilize carbon dioxide refrigerants where the heat of rejection is trans-critical, the heat rejecting heat exchanger is able to reject heat from the refrigerant without condensing the refrigerant. Hot gas valve 124 is selectively opened to direct warm refrigerant from the compressor 114 directly to the evaporator 120 to remove or harvest ice cubes from the freeze plate 110 when the ice has reached the desired thickness.

The refrigerant expansion device 118 can be of any suitable type, including a capillary tube, a thermostatic expansion valve, or an electronic expansion valve. In certain embodiments, where the refrigerant expansion device 118 is a thermostatic expansion valve or an electronic expansion valve, the ice maker 110 may also include a temperature sensor 126 placed at the outlet of the evaporator 120 to control the refrigerant expansion device 118. In other embodiments, where the refrigerant expansion device 118 is an electronic expansion valve, the ice maker 110 may also include a pressure transducer (not shown) placed at the outlet of the evaporator 120 to control the refrigerant expansion device 118 as is known in the art. In the illustrated embodiment, a condenser fan 115 is positioned to blow the gaseous cooling medium across the condenser 114. In an exemplary embodiment, the condenser fan 115 is a variable speed fan having a plurality of speed settings, including at least a normal speed and a high speed. The compressor 112 cycles a form of refrigerant through the condenser 114, expansion device 118, evaporator 120, and the hot gas valve 124, via refrigerant lines.

Referring still to FIG. 1, a water system of the illustrated ice maker 10 includes a sump 130, a water pump 132, a water line 134 (broadly, passaging), and a water level sensor 136. The water pump 132 could be a fixed speed pump or a variable speed pump to provide a broader range of control possibilities. The water system of the ice maker 103 further includes a water supply line 138 and a water inlet valve 140 for filling the sump 130 with water from a water source (e.g., a municipal water utility). The illustrated water system further includes a drain line 142 (also called, drain passaging or a discharge line) and a drain valve 144 (e.g., purge valve, drain valve; broadly, a purge device) disposed thereon for draining water from the sump 130. The sump 130 may be positioned below the freeze plate 110 to catch water coming off of the freeze plate such that the relatively cool water falling from the freeze plate may be recirculated by the water pump 132. The water line 134 fluidly connects the water pump 132 to a water distributor 146 above the freeze plate. During an ice batch production cycle, the pump 132 is configured to pump water through the water line 134 and through the distributor 146. The distributor is configured to distribute the water imparted through the distributor 146 evenly across the front of the freeze plate 110 so that the water flows downward along the freeze plate and any unfrozen water falls off of the bottom of the freeze plate into the sump 130. In the illustrated embodiment, the water system further comprises a water filter 147 configured to filter the water imparted into the ice maker 103 for making ice. The water filter 147 comprises one or more replaceable filter cartridges. The filter cartridges become spent over time and should be replaced. In the illustrated embodiment, the water filter 147 is shown upstream of the water inlet valve 140. However, it will be understood that the water filter could also be downstream of the water inlet valve in one or more embodiments.

In an exemplary embodiment, the water level sensor 136 comprises a remote air pressure transducer 148. It will be understood, however, that any type of water level sensor may be used in the ice maker 103 including, but not limited to, a float sensor, an acoustic sensor, or an electrical continuity sensor. The illustrated water level sensor 136 includes a fitting 150 that is configured to couple the sensor to the sump 130. The fitting 150 is fluidly connected to a pneumatic tube 152. The pneumatic tube 152 provides fluid communication between the fitting 150 and the air pressure transducer 148. Water in the sump 130 traps air in the fitting 150 and compresses the air by an amount that varies with the level of the water in the sump. Thus, the water level in the sump 130 can be determined using the pressure detected by the air pressure transducer 148. Additional details of exemplary embodiments of a water level sensor comprising a remote air pressure transducer are described in U.S. Patent Application Publication No. 2016/0054043, which is hereby incorporated by reference in its entirety.

An exemplary ice maker of the type shown in FIG. 1 is more fully described in U.S. patent application Ser. No. 17/147,965, entitled Ice Maker, filed Jan. 15, 2021, which is hereby incorporated by reference in its entirety.

Figure 2:
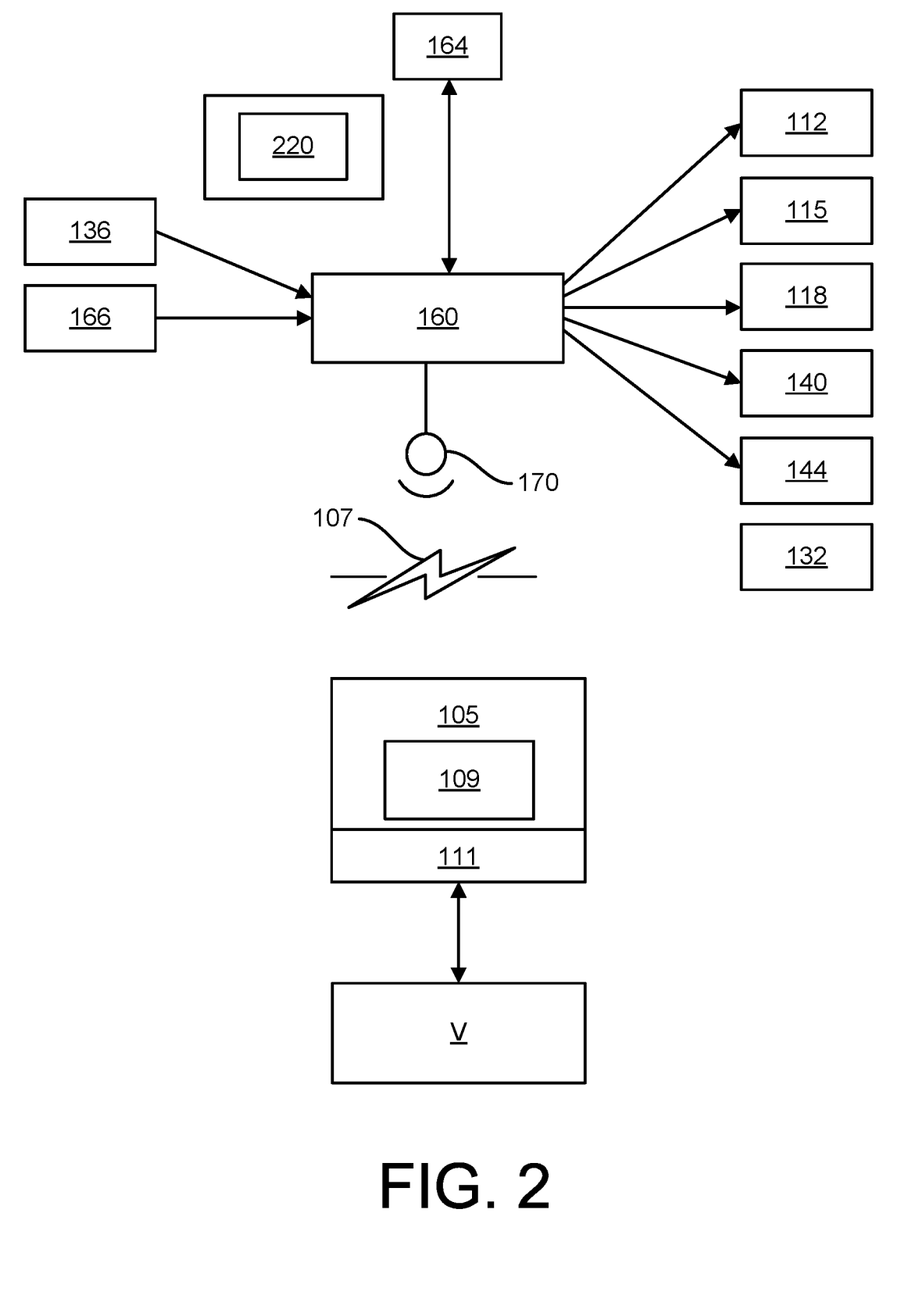
FIG. 2 is a schematic block diagram of a control system of the ice maker and remote communication system for the ice maker.

Referring to FIGS. 1 and 2, the ice maker 103 includes a controller 160. The controller 160 includes at least one processor 162 for controlling the operation of the ice maker 103, e.g., for controlling at least one of the refrigeration system and the water system. The processor 162 of the controller 160 may include a non-transitory processor-readable medium storing code representing instructions to cause the processor to perform a process. The processor 162 may be, for example, a commercially available microprocessor, an application-specific integrated circuit (ASIC) or a combination of ASICs, which are designed to achieve one or more specific functions, or enable one or more specific devices or applications. In certain embodiments, the controller 160 may be an analog or digital circuit, or a combination of multiple circuits. The controller 160 may also include one or more memory components 164 (FIG. 2) for storing data in a form retrievable by the controller. The controller 160 can store data in or retrieve data from the one or more memory components 164.

For example, in one or more embodiments in the scope of this disclosure, the controller 160 is configured to communicate with a memory 164 having at least the registers 1-5 indicated in Table 1 below. In register 1, the controller 160 tolls the total amount of time that water inlet valve 140 is open. As explained more fully below, in register 2, the illustrated controller 160 is configured to calculate an estimate of total flow through the water inlet valve 140 based on the value stored in register 1. In register 3, the controller 160 is configured to store an indication of whether the user of the ice maker wishes to receive automatic reminders when the replaceable water filter cartridge should be replaced. Suitably, the ice maker 103 includes a user interface to which the user can make an input selecting whether or not to receive such reminders. In register 4, the controller 160 is configured to store a limit value at which the ice maker 103 automatically generates an alarm indication/reminder that the water filter cartridge requires replacement. Register 5 is a memory location for a flag to reset register 1 and/or register 2. In one or more embodiments, the ice maker 103 comprises a user interface that allows the user to make an input triggering register 5 to reset register 1 and/or register 2. In another embodiment, the ice maker can comprise a sensor for detecting when the water filter cartridge is replaced. Upon receipt of a signal from such a sensor, the controller 160 automatically uses register 5 to reset register 1 and/or register 2 in response to the filter cartridge being replaced.

TABLE 1

| Register # | Description | Units |
|---|---|---|
| 1 | Open time for water inlet valve 140 | Hours |

TABLE 1-continued

| Register # | Description | Units |
|---|---|---|
| 2 | Total flow volume | Gallons |
| 3 | Toggle alarm indication for water filter replacement | Binary: ON/OFF |
| 4 | Total flow volume alarm limit | Gallons |
| 5 | Reset total flow volume counter | Binary: ON/OFF |

Referring to FIG. 2, in the illustrated embodiment, the control system further comprises a local user interface device 220 that includes a display. For example, in one or more embodiments, the user interface device 220 comprises a local touch screen display that is mounted on the exterior of the ice maker 103. The controller 160 is connected to the user interface device 220 to receive user inputs to the interface device and to control the user interface device to display one or more display screens on the display.

The appliance control system further comprises a network interface 170 configured to connect the appliance 103 to the client-server network 107 for communication with a remote asset management server 105. In other words, the network interface 170 is configured to provide communication between the local controller 160 of the appliance 103 and the remote asset management server 105. An exemplary embodiment of communications architecture for use in an asset management system for appliances is described in greater detail in U.S. Pat. No. 9,863,694, which is hereby incorporated by reference in its entirety. The illustrated network interface 170 comprises a wireless transceiver such as a cellular data transceiver or a Wi-Fi transceiver. Other types of network interfaces (e.g., hardwired internet ports, etc.) can also be used without departing from the scope of the disclosure. The network interface 170 is broadly configured to pass operating data from the appliance 103 to the asset management server 105 and pass commands from the asset management server to the appliance. An exemplary asset management system for performing maintenance compliance tasks is described more fully in U.S. patent application Ser. No. 17/686,986, filed Mar. 4, 2022, entitled Systems and Methods for Monitoring Refrigeration Appliances, which is hereby incorporated by reference in its entirety.

In the illustrated embodiment, the asset management server 105 comprises a purchasing server that includes an application programming interface (API) 111 through which the asset management server is configured to connect to one or more web-based vendor platforms V that sell replaceable water filter cartridges for delivery. As explained more fully below, in certain embodiments, the asset management server 105 is configured to enact automated purchase transactions on behalf of the ice maker operator to purchase replacement water filter cartridges from the vendor website V the when filter cartridges are in need of replacement.

The server 105 can also store contact information (e.g., cell phone number and/or email address) for the ice maker operator in the memory 109. In certain embodiments, the server 105 uses the stored contact information to push notifications to the operator using their stored points of contact.

During typical use, the controller 160 is generally configured to conduct consecutive ice batch production cycles. Each ice batch production cycle comprises steps of freezing the ice (a freeze step), harvesting the ice (a harvest step), and filling the sump 130 (a fill step). At least some of the ice batch production cycles comprise steps of purging hard water from the sump 130 after a batch of ice is formed and before the sump is refilled (a purge step).

An exemplary embodiment of a typical ice batch production cycle will now be briefly described. During the freeze step, the refrigeration system is operated to cool the freeze plate 110. At the same time, the pump 132 circulates water from the sump 130 through the water line 134 and further through the distributor 146. The distributor 146 distributes water along the top portion of the freeze plate 110. As the water flows down the front of the freeze plate 110, some of the water freezes into ice, forming ice pieces on the freeze plate of gradually increasing thickness. The unfrozen water falls off of the freeze plate 110 back into the sump 130.

When the ice reaches a thickness that is suitable for harvesting, the controller 160 switches from the freeze step to the ice harvest step. The pump 132 is turned off and the hot gas valve 124 is opened to redirect hot refrigerant gas to the evaporator 120. The hot gas warms the freeze plate 110, causing the ice to melt. The melting ice falls from the freeze plate into an ice bin (not shown) below. The hot gas valve 124 is closed after the ice has fallen from the freeze plate, as indicated by the harvest sensor 166.

Before beginning another ice batch production cycle, the sump 130 must be refilled. The sump has an end-of-circulation water level that is less than an ice making water level at which the ice maker begins each ice batch production cycle. Thus, before beginning a subsequent freeze step, the controller 160 opens the water inlet valve 140 to let new supply water into the sump 130. The water filter 147 filters the water imparted into the sump. The controller 160 closes the water inlet valve 140 when the water level sensor 136 provides an indication to the controller that the water level in the sump 130 reaches the ice making water level. As explained more fully below, in the illustrated embodiment, the controller 160 is configured to monitor the amount of time that the water inlet valve 140 is open in order to fill the sump 130 to the ice making water level.

At least periodically, it is beneficial to purge a portion of the water from the sump 130 before beginning a new ice production cycle. This is advantageous because, during the freeze step, as the water flows down the front of the freeze plate 110, impurities in the water such as calcium and other minerals in solution will remain in solution with the liquid water as purer water freezes. Thus, during each freeze step, the concentration of impurities in the water will increase. Excessive concentrations of impurities can quickly degrade the performance of the ice maker and even render it inoperable. Thus, periodically, the controller 160 will conduct a purge step before the fill step by opening the drain valve 144 to purge a portion of the residual water from the sump 130 from the end-of-circulation water level to a purge threshold water level. The drain valve 144 is one suitable type of purge mechanism but other types of purge mechanisms (e.g., active drain pumps) can also be used to execute the above-described purge step without departing from the scope of the disclosure. In an exemplary embodiment, the user interface device 220 enables a user to selectively set the frequency of purge cycles and/or to set the purge threshold water level for the ice maker 103.

In the illustrated embodiment, the local ice maker controller 160 is configured to use the memory registers shown in Table 1 above to determine a parameter indicative of a total amount of water filtered by the replaceable filter cartridge, and based on the determined parameter, to at least one of (i) provide a numerical indication of the total amount of water filtered by the replaceable filter cartridge; and (ii) determine that the replaceable filter cartridge requires replacement and output an alarm indication in response. Accordingly, the present disclosure generally contemplates automated tracking of the amount of water that is filtered by a replaceable water filter cartridge so that the user or the controller 160 can schedule filter cartridge replacement based on the amount of water filtered, rather than the gross amount of time the filter is in service. It will be appreciated that any of the filter maintenance operations (e.g., operations (i) and (ii)) that are described herein as being performed by the local ice maker controller 160 could also be performed remote from the ice maker, e.g., by the asset management server 105. For example, it is expressly contemplated that that the amount of water filtered could be determined by the remote asset management server 105 based on operating data transmitted from the ice maker 103 to the asset management server over the communication network 107. Likewise, it is contemplated that the remote asset management server 105 could provide an alarm indication (e.g., a push notification) based on a determination that the filter cartridge requires replacement because of the amount water that has been filtered.

Various ways of determining a parameter indicative of a total amount of water filtered by a replaceable filter cartridge may be used without departing from the scope of the disclosure. In an exemplary embodiment, the water inlet valve 140 has a generally fixed volumetric flow rating such that volumetric flow rate through the water inlet valve when opened is substantially constant at constant water supply pressure. In this embodiment, the controller 160 is configured to determine a cumulative amount of time that the water inlet valve 140 is opened (e.g., by accessing memory register 1 in table 1 above) and to determine the parameter based on the amount of time that the water inlet valve has been opened. For example, the parameter indicative of total flow can be an estimate of total flow volume through the water inlet valve 140. The controller 160 can be configured to determine the estimate of total flow volume through the water inlet valve 140 as a multiple of the cumulative amount of time that the water inlet valve has been open, stored in memory register 1, and a predetermined volumetric flow rate estimate for the valve 140.

For instance, some valves have manufacturer-issued volumetric flow ratings based on certain assumptions about water supply pressures and the defined cross-sectional area of the flow path through the valve when opened. The controller 160 can be configured to calculate the cumulative flow (stored in register 2) as a multiple of the cumulative time that the valve has been open since a cartridge is placed into service (register 1), times the manufacturer-issued volumetric flow rating.

In certain embodiments, the water system of the ice maker further comprises a water pressure sensor (not shown) configured to output a water pressure signal representing water supply pressure to the water inlet valve. In such an embodiment, the controller 160 can be configured to use the pressure signal to determine the total flow volume stored in register 2. For example, the controller 160 can be configured to determine the total flow volume by estimating volumetric flow rate through the valve based on the water pressure signal and multiplying the estimated volumetric flow rate by the determined amount of time stored in register 1 of the controller memory.

In still other embodiments, the ice maker 106 can employ a flow meter (not shown) along the water inlet line so that the controller 160 can calculate the total volumetric flow as a function of the measured flow rate when the valve 140 is open.

Suitably, the controller 160 is configured to reset register 1 whenever the replaceable water filter cartridge is replaced. In an exemplary embodiment, the user can make an input to the user interface device 220 to indicate when the water filter cartridge is replaced. When the controller 160 receives such an input, it sets the reset flag in register 5 to reset registers 1 and 2 in the controller memory 164. Instead of requiring a user input to indicate when a water filter cartridge is replaced, the controller 160 can also be connected to a sensor (e.g., proximity sensor or the like) that signals when a spent filter cartridge is removed and/or when a new filter cartridge is installed. The controller 160 can automatically set the reset flag in register 5 to reset registers 1 and 2 in response to receiving such a signal.

Figure 3:
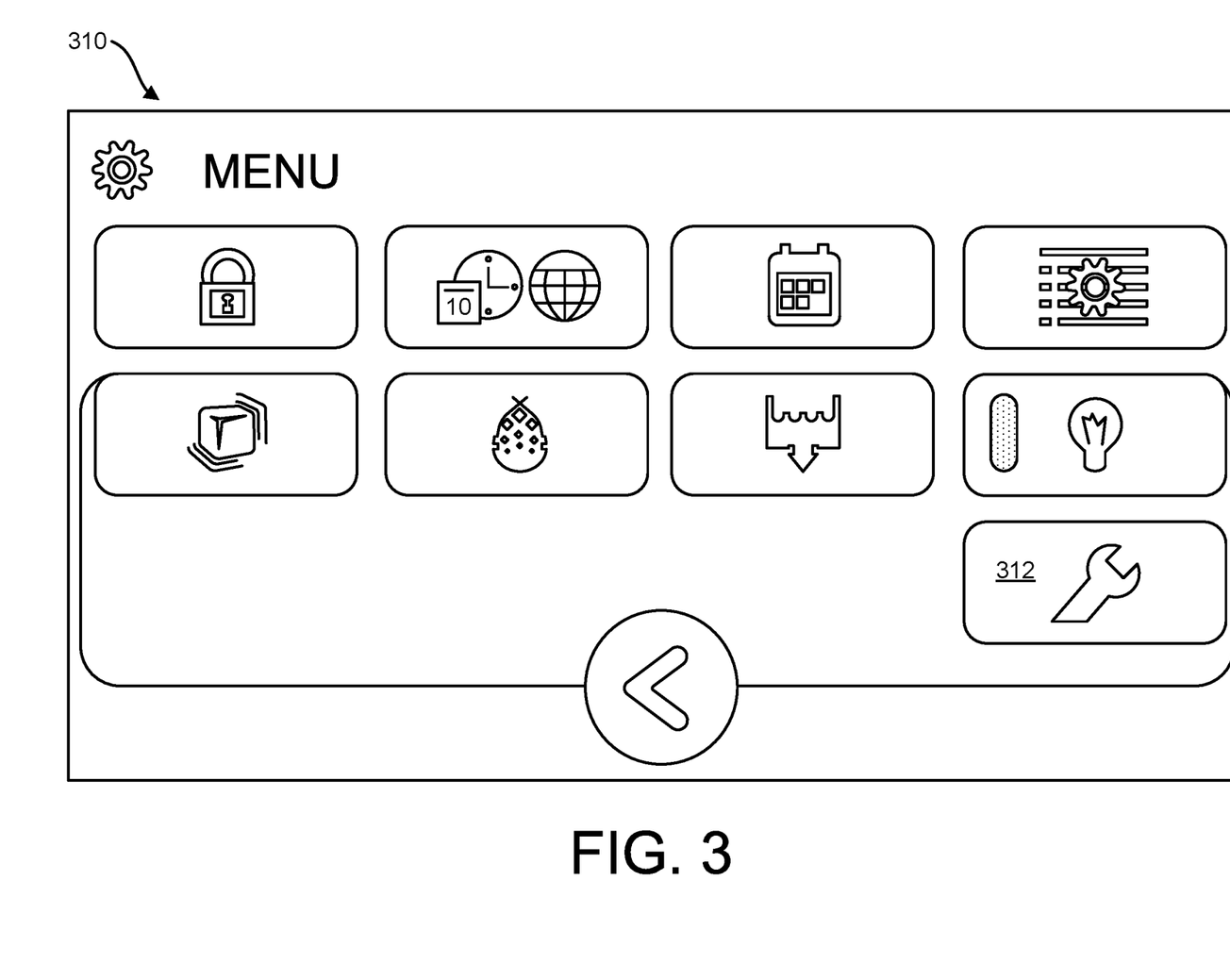
FIG. 3 is a screen shot of a main menu display screen of the ice maker.
Figure 4:
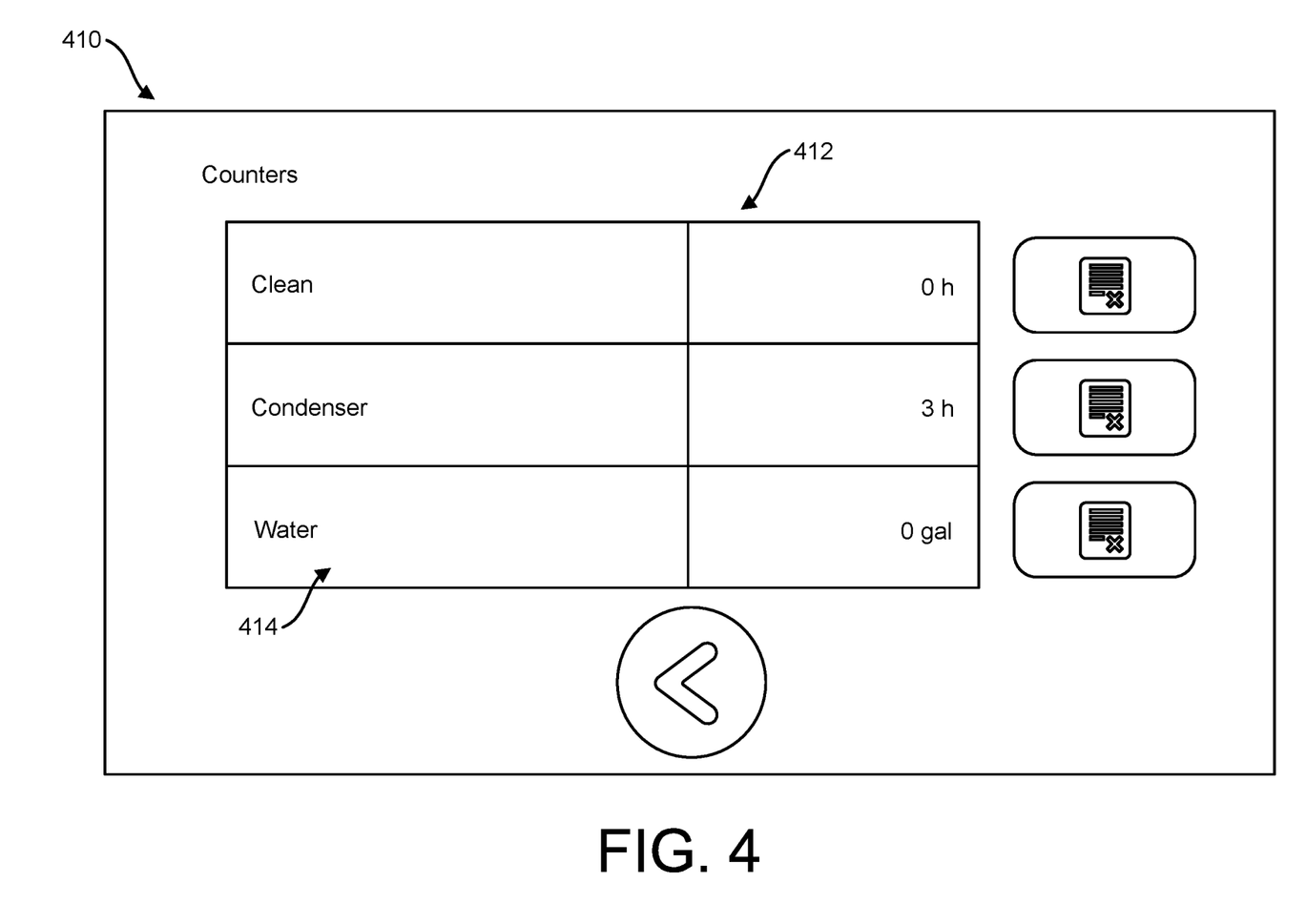
FIG. 4 is a screen shot of a service counters display screen of the ice maker.
Figure 5:
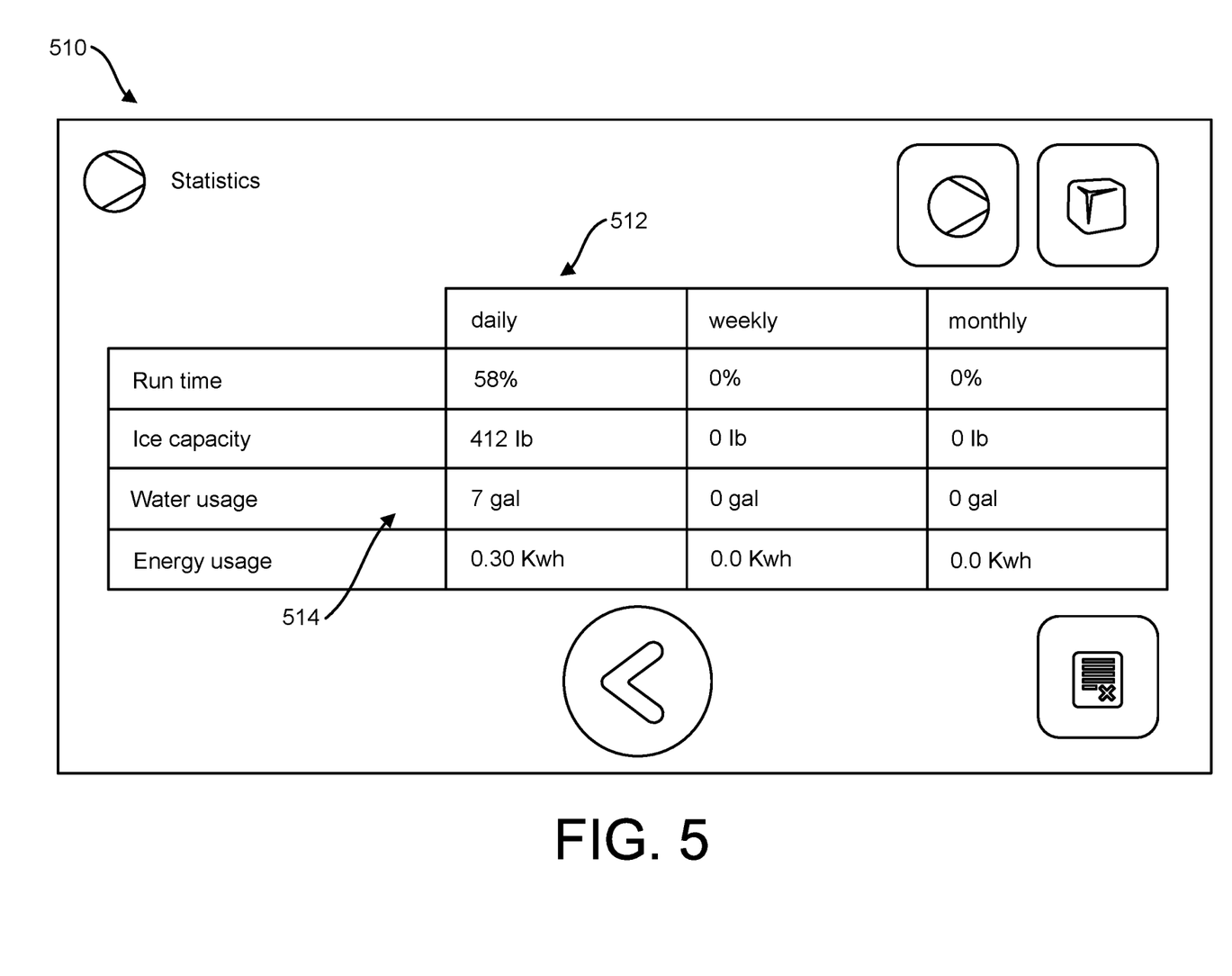
FIG. 5 is a screen shot of a usage statistics display screen of the ice maker.

Referring to FIGS. 3-5, in certain embodiments, the controller 160 is configured to selectively display the numerical indication of the amount of water filtered by the replaceable water filter cartridge on the display of the user interface device 220. For example, in the illustrated embodiment, the display is configured to display a main menu 310 shown in FIG. 3. The user can select the wrench icon 312 from the main menu 310 to access a service counters display 410, shown in FIG. 4. The service counters display 410 includes a service count table 412 including a water usage display line 414. As can be seen, the water usage display line 414 is configured to display the value stored in register 2 of the controller memory, e.g., the total flow volume through the replaceable filter cartridge in a defined unit of measure, such as gallons. Accordingly, it can be seen that an operator of an ice maker 103 can quickly obtain an estimate of the amount of water filtered by a replaceable filter cartridge, which provides a very accurate estimate of usage from which to determine whether the cartridge requires replacement. In certain embodiments, the display can also display a usage statistics display 510 (FIG. 5) that includes a statistics table 512 comprising a water usage line 514. The water usage line 514 includes water usage rates calculated as a function of the total flow volume over the life of the ice maker divided by the gross amount of time that the ice maker 103 has been in service. The total flow volume over the life of the ice maker can be calculated as a function of the total amount of time that the water inlet valve 140 is open. It is also contemplated that the displays 310, 410, 510 can be provided remotely on a mobile device in communication with the asset management server 105.

Via the user interface device 220, the user can select whether to receive alarms/reminders when the water filter cartridge needs replacement. In response, the controller 160 stores a suitable indication in memory location 3 shown in Table 1 above. If the user opts to receive such alarms/reminders, the user can also use the user interface device 220 to select an alarm limit corresponding to the flow rating of the replaceable filter cartridge. The controller 160 stores this alarm limit in register 4 of the memory 164 as indicated in Table 1 above. The controller 160 can determine that the replaceable filter cartridge requires replacement by comparing the total flow volume stored in register 2 to the predefined total flow volume limit stored in register 4 (broadly, predefined parameter limit). When the controller 160 determines that the total flow volume exceeds the predefined total flow volume limit, the controller can output an alarm indication on the display and/or send an alarm indication to the asset management server 105 for further processing. (The asset management server can also be configured to make its own determination of when the total flow volume exceeds the total flow volume limit and respond by triggering an alarm indication in one or more embodiments). The asset management server 105 can be configured to push an alarm notification to an ice maker operator via SMS text message, email, or other suitable messaging system.

As explained above, in one or more embodiments, the asset management server 105 comprises a purchasing server configured to communicate with a web-based vendor platform V for a vendor of replaceable water filter cartridges. In these embodiments, the purchasing server 105 is configured to automatically purchase a new replacement filter cartridge for the ice maker 103 in response to the controller 106 or the purchasing server 105 determining that the replaceable cartridge filter requires replacement. It is also envisioned that the server 105 could order the replacement filter shortly before it becomes fully spent. This way, the new filter cartridge is shipped and ready for use when the current filter becomes spent. In these embodiments, the server 105 could be configured to retrieve information about lead times and shipping times from the vendor platform V and factor these parameters into its decision of when to place an order for a new cartridge.

In one more embodiments, in response to determining that the replaceable cartridge filter requires replacement (e.g., that the value in register 2 exceeds the value in register 4), the controller 160 is configured to send a push notification signal via the transceiver 170 over the network 107, wherein the push notification signal is configured to cause the server 105 to send a push notification to the operator of the ice maker. Again, the asset management server 105 can also be configured to make the determination that the filter cartridge is spent independent of such determination being made by the local controller 160. In either case, the asset server 105 is can notify the operator of the ice maker 103 by pushing a notification via text message or email. Of course, the content of the push notification would remind the operator that the water filter cartridge is in need of replacement.

It can now be seen that the present disclosure addresses the ice maker maintenance challenge that water consumption will be different for every ice maker 103. The inventors believe that it is insufficient to simply set a maintenances filter replacement schedule based on a defined interval of time. In the case of ice makers with low water usage, operating costs can be reduced by increasing the interval of time between cartridge replacements. In the case of ice makers with high water usage, performance can be improved by replacing the filter cartridges more frequently. This disclosure proposes tracking filter usage in terms of the amount of time the water inlet valve 160 is open, rather than in terms of the gross service time of the filter cartridge. This way, for ice makers with increased purge settings, filter cartridges will be replaced more frequently, ensuring desired water quality is maintained; and for ice makers with reduced purge settings, filter cartridges will be replaced less frequently, saving on the cost of operation.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor (s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. An ice maker comprising:
    an ice formation device;
    a refrigeration system for cooling the ice formation device;
    a water system supplying water to the ice formation device, the water system including a water inlet valve and a water filter, the water inlet valve configured to be selectively opened to supply water to the ice maker, the water filter configured to filter the water supplied to the ice maker, the water filter including a replaceable filter cartridge, the refrigeration system configured to cool the ice formation device such that at least some of the filtered water from the water system forms into ice on the ice formation device; and
    a controller operatively connected to the water system, the controller configured to:
        determine a parameter indicative of a total amount of water filtered by the replaceable filter cartridge; and based on the determined parameter, (i) provide a numerical indication of the total amount of water filtered by the replaceable filter cartridge; and (ii) determine that the replaceable filter cartridge requires replacement and output an alarm indication in response;
    wherein the water inlet valve has a fixed volumetric flow rating such that volumetric flow rate through the water inlet valve when opened is substantially constant at constant water supply pressure;
    wherein the controller is configured to determine an amount of time that the water inlet valve is opened and the controller is configured to determine the parameter based on the amount of time that the water inlet valve is opened;
    wherein the ice maker further comprises a memory having at least a first register for the total amount of time that the water inlet valve is open and a second register for the numerical indication of the total volume of water filtered by the replaceable filter cartridge, the controller configured to toll the amount of time that the water inlet valve is open in the first memory register, to calculate the numerical indication of the total volume of water filtered by the replaceable filter cartridge as a function of the first register, and to store the numerical indication of the total volume of water filtered by the replaceable filter cartridge in the second register.

2. The ice maker as set forth in claim 1, wherein the water system further comprises a water pressure sensor configured to output a water pressure signal representing water supply pressure to the water inlet valve.

3. The ice maker as set forth in claim 2, wherein the controller is configured to determine the parameter based on the water pressure signal.

4. The ice maker as set forth in claim 3, wherein the controller is configured to determine the parameter by estimating volumetric flow rate through the valve based on the water pressure signal and multiplying said estimated volumetric flow rate by the determined amount of time.

5. The ice maker as set forth in claim 1, wherein the parameter is an estimate of total flow volume through the water inlet valve, the controller being configured to determine the estimate of total flow volume through the water inlet valve as a multiple of the determined amount of time and a predetermined metered volumetric flow rate estimate for the valve.

6. The ice maker as set forth in claim 1, further comprising a user interface device having a display.

7. The ice maker as set forth in claim 6, wherein the controller is configured to selectively display the numerical indication of the amount of water filtered by the replaceable water filter cartridge on the display.

8. The ice maker as set forth in claim 6, wherein the controller is configured to display an alarm indication on the display in response to determining that the replaceable filter cartridge requires replacement.

9. The ice maker as set forth in claim 8, wherein determining the replaceable filter cartridge requires replacement comprises determining that the determined parameter exceeds a predefined parameter limit.

10. A system comprising the ice maker as set forth in claim 1, a notification server, and a network, the ice maker and the notification server being remotely connected by the network, wherein the notification server is configured to push a notification to a user of the ice maker in response to one of the controller or the notification server determining that the replaceable cartridge filter requires replacement.

11. A system comprising the ice maker as set forth in claim 1, a purchasing server, and a network, the ice maker and the purchasing server being remotely connected by the network, wherein the purchasing server is configured to automatically purchase a new replacement filter cartridge for the ice maker in response to the controller or the purchasing server determining that the replaceable cartridge filter requires replacement.

12. The ice maker as set forth in claim 1, further comprising a transceiver connecting the controller to a network, wherein in response to determining that the replaceable cartridge filter requires replacement, the controller is configured to send a push notification signal via the transceiver over the network, the push notification signal causing a notification to be pushed to a user of the ice maker.

13. The ice maker as set forth in claim 1, further comprising a transceiver connecting the controller to a network, wherein in response to determining that the replaceable cartridge filter requires replacement, the controller is configured to send a signal via the transceiver over the network, the signal causing an automated purchase transaction to be conducted for purchase of a new replaceable filter cartridge for the ice maker.

\* \* \* \* \*